E. C. SCHROEDER.
BUILDING AND CAR DOOR.
APPLICATION FILED APR. 13, 1911.
998,207.
Patented July 18, 1911.
2 SHEETS—SHEET 1.
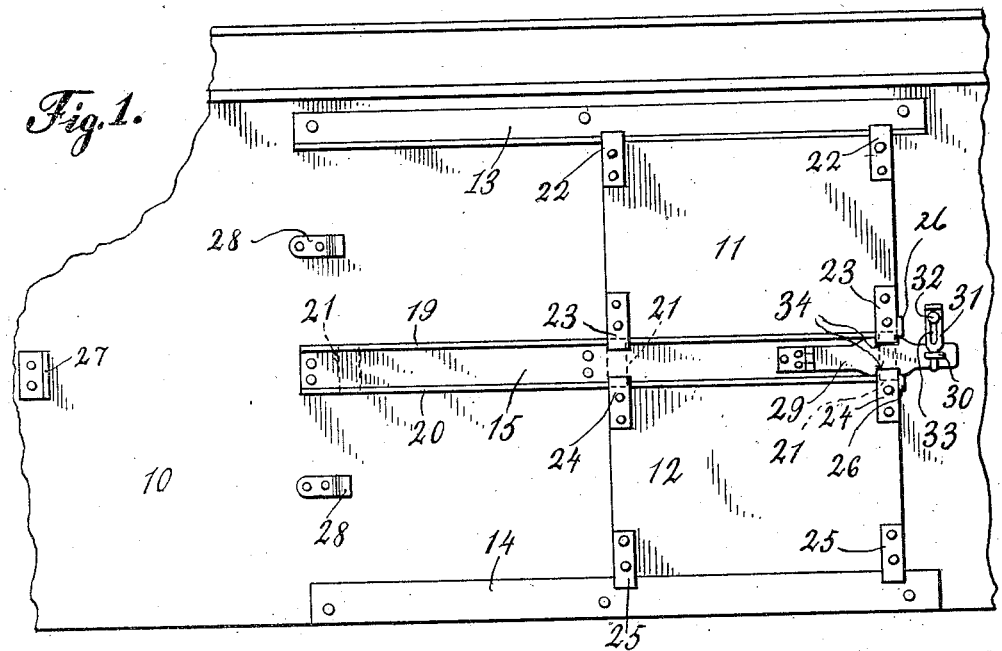
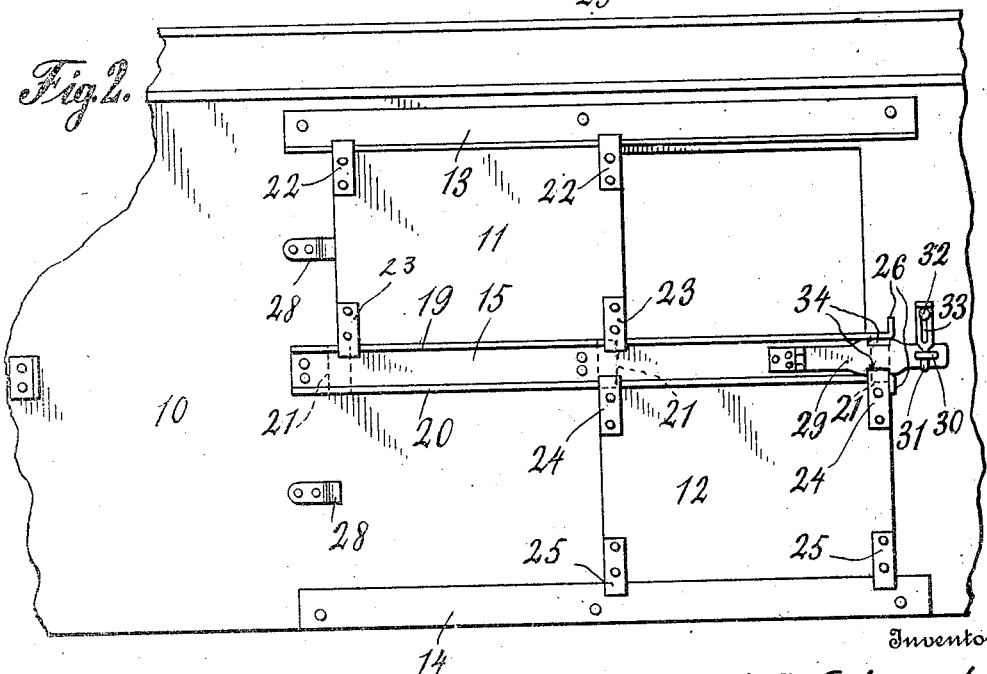
Witnesses
E. Larson
Inventor
Edward C. Schroeder
By
Attorneys

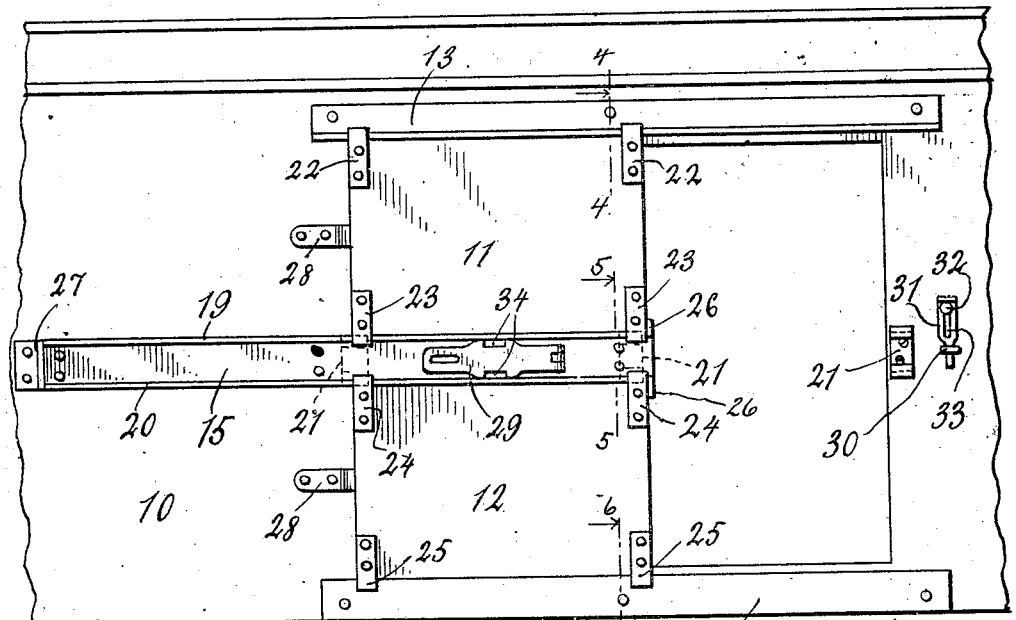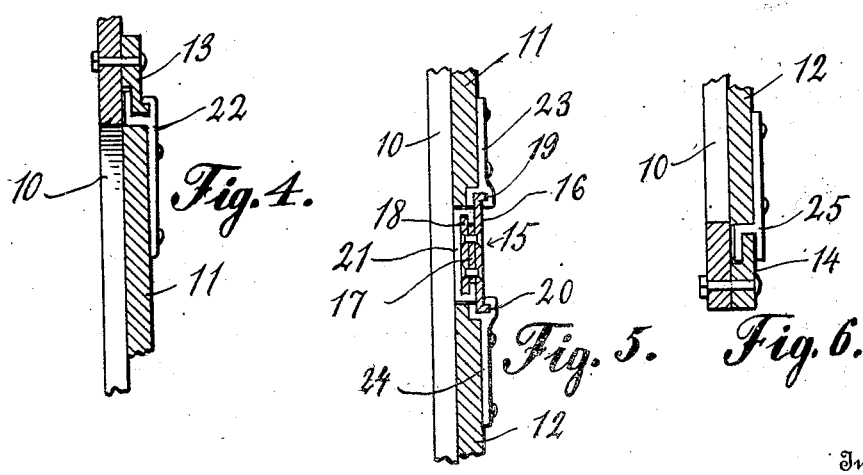

UNITED STATES PATENT OFFICE.

EDWARD C. SCHROEDER, OF CLINTONVILLE, WISCONSIN.

BUILDING AND CAR DOOR.

998,207.

Specification of Letters Patent. Patented July 18, 1911.

Application filed April 13, 1911. Serial No. 620,760.

*To all whom it may concern:*

Be it known that I, EDWARD C. SCHROEDER, a citizen of the United States, residing at Clintonville, in the county of Waupaca and State of Wisconsin, have invented certain new and useful Improvements in Building and Car Doors, of which the following is a specification.

This invention relates to that class of doors which are slidable across and away from the door opening; and it is the object of the invention to provide a door of this kind which is in two sections, the same being so mounted that either one or both sections can be slid into open and closed position.

The invention also has for its object to provide improved supporting means for the door sections, together with an improved fastening therefor.

With these objects in view, the invention consists in a novel construction and arrangement of parts to be hereinafter described and claimed, reference being had to the accompanying drawings forming a part of this specification, in which drawings—

Figure 1 is an elevation of the door in closed position. Fig. 2 is a similar view showing one of the door sections open. Fig. 3 is an elevation showing both door sections open. Figs. 4, 5 and 6 are vertical sections on the lines 4—4, 5—5 and 6—6, respectively, of Fig. 3.

Referring specifically to the drawings, 10 denotes one of the side walls of a freight car to which the door and the parts associated therewith, which are the subject of the present invention, are applied. The door is in two sections which are indicated at 11 and 12, respectively. At the top and bottom of the door opening are stationary tracks 13 and 14, respectively, and midway therebetween is a sliding track 15, the length of these tracks being substantially twice the width of the door sections. The upper door section is supported by the tracks 13 and 15, and said track 15 and the track 14 support the lower door section.

The sliding middle track 15, as shown in Fig. 5, is built up of three pieces, to wit: a channel bar 16, and two strips 17 and 18 of different widths, all riveted or otherwise rigidly connected. The track is so positioned that the flanges of the channel bar extend horizontally and outwardly, the top flange being indicated at 19 and the bottom flange at 20. The strips 17 and 18 form a T-shaped rib on the back of the channel bar, whereby the track is slidably supported by means of brackets 21 engageable with said rib, said brackets being shaped to fit the rib. Three of these brackets are employed, they being rigidly mounted on the wall 10, two on one side of the door opening, and the other one on the other side thereof. Two of these brackets are located close to the door opening, and the other one is spaced therefrom a distance equal to substantially the width of the door opening, in view of which the track will always be in engagement with at least two of the brackets.

To the top of the upper door section 11 are secured hangers 22 which engage the top track 13, and to the bottom of said door section are secured slides 23 which engage the sliding middle track 15, said slides being shaped to hook over the top flange 19 of said track. To the top of the lower door section 12 are secured hangers 24 which engage the bottom flange 20 of the sliding middle track 15, and said lower door section is supported at its bottom on the track 14 by slides 25. The hangers and slides herein described are suitably shaped to prevent the door from falling forwardly off the tracks. At the latch end of the track 15, the flanges 19 and 20 thereof have bends 26 which prevent the door sections from leaving the track at this end. In the path of the other end of the track is a stop 27 to limit the movement of the track in that direction. The movement of the door sections to open position is limited by stops 28 secured to the wall 10.

The forward end of the sliding middle track carries a pivoted hasp 29 which is engageable with a staple 30 located adjacent to the latch end of the door opening. A sliding latch pin 31 is provided for securing the hasp over the staple, said latch pin being slidably mounted adjacent to the staple by means of a bolt 32 secured to the car wall, and passing through a slot 33 in the pin. By this construction the pin is prevented from getting lost and it is always ready for use. The hasp 29 lies in the channel of the track 15, and its top and bottom edges are notched as indicated at 34 to receive the slide 23 and the hanger 24 at the forward end of the two door sections as shown in Fig. 1, whereby said sections are locked in closed position when the hasp is engaged with the staple.

By the construction herein described, it is possible to open either one or both door sections, and also to slide the track 15 entirely out of the doorway. Fig. 1 shows both door sections closed and locked. The middle track 15 has been slid forwardly and locked by the hasp and staple, and the two door sections are locked by the engagement of the parts 23 and 24 with the notches 34 of the hasp. The door sections cannot be opened until the hasp is released and swung outwardly to disengage the parts 23 and 24.

Fig. 2 shows the top door section open and the bottom door section closed. The parts are placed in this position by releasing the hasp, and swinging the same outwardly sufficient to release the part 23, after which the top door section can be slid to open position. The hasp is then replaced into locking position so that the part 24 engages the bottom notch. The track 15 remains in position extending across the doorway, and it is locked in this position as before by means of the hasp and staple, the latter also locking the bottom door section as already described. If the bottom door section is to be opened also, it is released by disengaging the hasp, after which it may be slid open as shown in Fig. 3, and the track 15 may then also be slid away from the door opening to leave the same entirely unobstructed as shown. If desired, the two door sections may also be partly opened, the track 15 in this position of the doors being extended across the doorway and locked by the hasp and staple, as in Fig. 1.

I claim:

1. A car door comprising upper and lower sliding sections, stationary top and bottom tracks, a slidable middle track, the upper door section being supported by the top track and the lower door section being supported by the bottom track, and both of said door sections also having sliding engagement with the middle track, and means for locking the middle track.

2. A car door comprising upper and lower sliding sections, stationary top and bottom tracks, a sliding middle track adapted to be extended across the doorway, and to be slid outwardly therefrom, and means for locking the sliding track in the first-mentioned position, the upper door section being supported by the top track and the lower door section being supported by the bottom track, and both of said door sections having a sliding engagement with the middle track.

3. A car door comprising upper and lower sliding sections, stationary top and bottom tracks, a sliding middle track, the upper door section being supported by the top track and the lower door section being supported by the bottom track, and both of said door sections having a sliding engagement with the middle track, a pivoted hasp carried by the middle track, the upper and lower edges of the hasp being notched, a staple with which said hasp is engageable for locking the middle track, and means on the door sections engageable with the aforesaid notches whereby the door sections are locked.

4. A car door comprising upper and lower sliding sections, stationary top and bottom tracks, a sliding middle track, said middle track having top and bottom horizontal flanges, guide members carried by the door sections and engageable with said flanges, a pivoted hasp carried by the middle track, the upper and lower edges of said hasp being notched to receive the guide members when the door sections are in closed position, and means for locking the hasp.

In testimony whereof I affix my signature in presence of two witnesses.

EDWARD C. SCHROEDER.

Witnesses:
R. G. GIBSON,
HENRY A. SCHROEDER.